Figure 1:
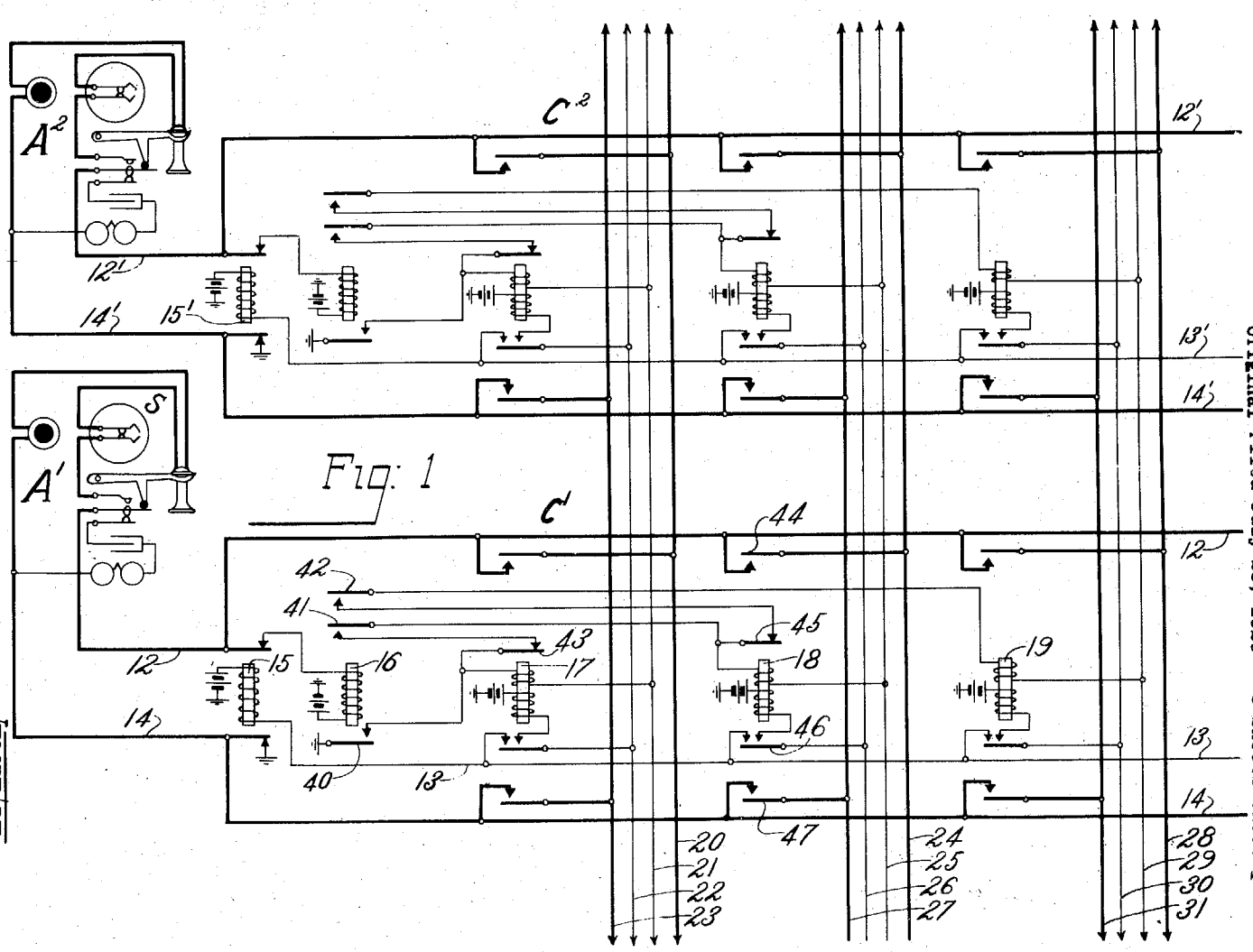

March 16, 1926. Re. 16,293

R. G. RICHARDSON

RELAY AUTOMATIC TELEPHONE SYSTEM

Original Filed July 28, 1920 3 Sheets-Sheet 1

Inventor
Rodney G. Richardson
R. G. Richardson Atty.

March 16, 1926. Re. 16,293

R. G. RICHARDSON

RELAY AUTOMATIC TELEPHONE SYSTEM

Original Filed July 28, 1920 3 Sheets-Sheet 2

Inventor
Rodney G. Richardson
R G Richardson Atty.

March 16, 1926. Re. 16,293

R. G. RICHARDSON

RELAY AUTOMATIC TELEPHONE SYSTEM

Original Filed July 28, 1920 3 Sheets-Sheet 3

Inventor
Rodney G. Richardson
R. G. Richardson Atty.

Reissued Mar. 16, 1926. Re. 16,293

UNITED STATES PATENT OFFICE.

RODNEY G. RICHARDSON, OF CHICAGO, ILLINOIS, ASSIGNOR, BY MESNE ASSIGNMENTS, TO AUTOMATIC ELECTRIC, INC., OF CHICAGO, ILLINOIS, A CORPORATION OF DELAWARE.

RELAY AUTOMATIC TELEPHONE SYSTEM.

Original No. 1,506,083, dated August 26, 1924, Serial No. 399,528, filed July 28, 1920. Application for reissue filed July 3, 1925. Serial No. 41,439.

*To all whom it may concern:*

Be it known that I, RODNEY G. RICHARDSON, a citizen of the United States of America, and a resident of Chicago, Cook County, and State of Illinois, have invented certain new and useful Improvements in Relay Automatic Telephone Systems, of which the following is a specification.

My invention relates in general to automatic telephone systems in which connections are established under the control of calling subscribers solely through the medium of relays at the central exchange; and the object of the invention is the provision of a simple and efficient system of this kind which is especially adapted for use in small isolated private exchanges, although there are certain features of improvement which will no doubt be of utility in larger systems.

It is of course necessary in all relay systems to keep the number of relays down to a minimum and various complicated trunking systems have been devised with this object in view. I find however that in very small systems nothing is gained by resorting to such expedients and I employ therefore a standard trunking system in which a plurality of trunks or link circuits are provided, all alike and in one group, which are accessible to all the subscribers' lines and which have access to all the subscribers' lines. When a calling subscriber removes his receiver his line is automatically connected with a trunk line extending to an idle relay connecting device. This connecting device may be compared to an automatic connector switch of well known type and is operated upon calling the proper digit or digits to complete the connection to any desired line.

Two of the principal features have to do with the trunk selecting mechanism and with the line connecting mechanism or means by which a selected trunk line is connected with a desired called line. As to the former, an individual relay trunk selector is provided for each line which operates according to an approved principle to select always the first idle trunk line. Since there is no common mechanism the trunk lines may be slipped in the multiple between the trunk selectors so that each trunk will be first choice to certain lines, thus equalizing the traffic. With regard to the latter feature, the line connecting mechanism, an essential part of this mechanism is the counting relays, which in this system are also the connecting relays. These relays respond to impulses from a calling station, and due to the provision of a novel control circuit, are provided only to the extent of one relay per digit, whereas so far as applicant is aware two relays per digit have formerly been used.

These improvements, and others not now specifically mentioned will be fully described in the course of the explanation of the operation of the complete system which will now be proceeded with, reference being had to the accompanying drawings.

Figure 2:
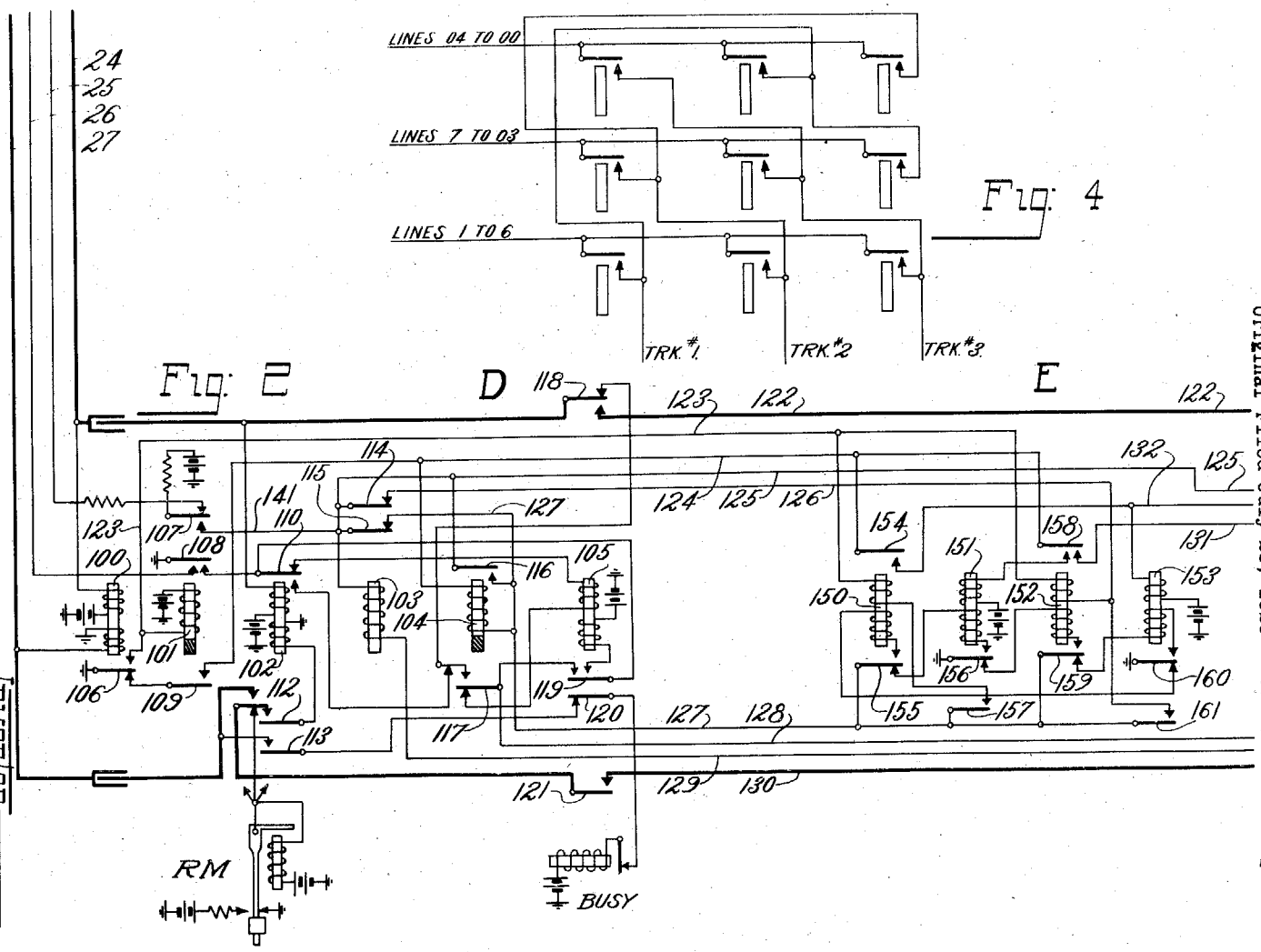
Figure 3:
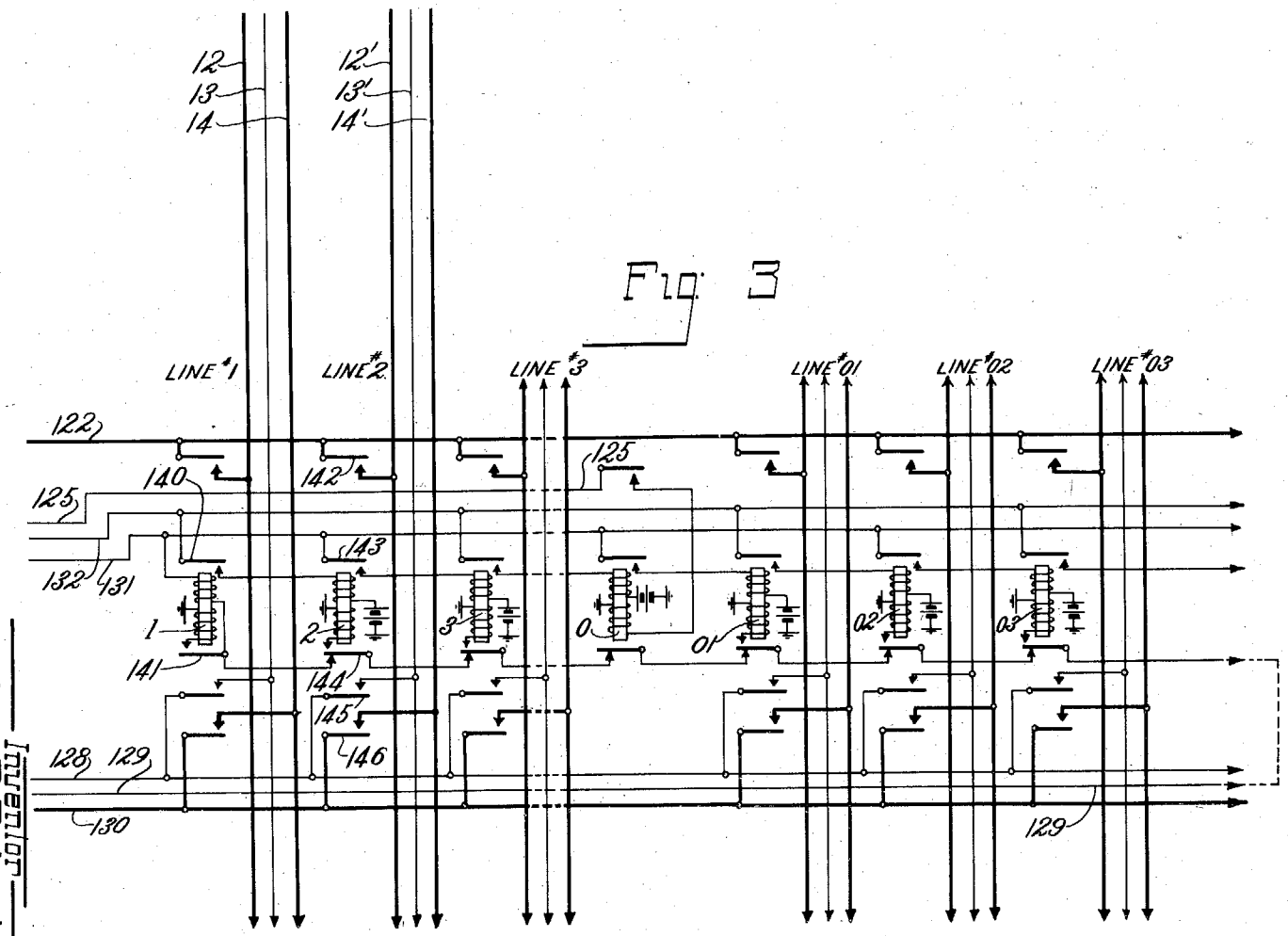

In the drawings, comprising Figs. 1, 2 and 3, I have shown by means of the usual circuit diagrams the essentials of a nineteen line relay automatic system, constructed according to my invention. Fig. 4, which is placed on the same sheet with Fig. 2, is a schematic drawing which shows an approved method of slipping the trunks in the multiple between the trunk selectors.

The apparatus shown in the drawings may be briefly described as follows: Substation A′ is an automatic substation of the usual type, having in addition to the talking instrumentalities a calling device S which is used by the subscriber to control the central office switching mechanism. The line conductors 12 and 14 extend to a central point where the switchboard is located and there terminate in the individual relay trunk selector C′. The trunk selector C′ comprises the line and cut off relays 16 and 15 and the trunk connecting relays 17, 18, and 19. As shown herein the system is intended to serve a total of nineteen lines and three trunks will usually be enough, though one or two more may be furnished if considered necessary. At any rate only three trunks are shown, the conductors 20 to 23, inclusive, being the conductors of the first trunk, conductors 24 to 27, inclusive, the second, and conductors 28 to 31 inclusive, the third. Relays 17, 18, and 19 are adapted to be separately energized, as will be explained, and are adapted to connect the line of substation A′ with the several trunk lines, respectively.

Substation $A^2$ is exactly like substation A′ and is provided at the exchange with the individual trunk selector $C^2$ which is in all respects like the trunk selector C′. Each of the other lines in the system is equipped in a similar manner and has access to the three trunk lines shown, which are multipled to contacts in the connecting relays of the trunk selectors according to the plan shown in Fig. 4. Referring to this diagram, since there are three trunk lines, the lines are divided into three groups. Lines 1 to 6, inclusive, constitute the first group; lines 7 to 9, inclusive, and 01 to 03, inclusive, constitute the second group; while lines 04 to 00, inclusive, constitute the third group. The three trunk lines are multipled straight to all the lines of the first group, but there is a slip between the first and second groups, and again between the second and third groups. This arrangement makes the first trunk first choice to the lines of the first group, the second trunk first choice to the lines of the second group, and the third trunk first choice to the lines of the third group, and is the usual expedient used in automatic systems to evenly distribute the traffic.

To proceed with the explanation, only the second trunk line, comprising conductors 24 to 27, inclusive, Fig. 1, is shown complete. These conductors extend to Fig. 2 where they terminate in the group of relays which is indicated by the reference character D. These relays may be termed a connector, and include the usual line and release relays 100 and 101 and other relays which have to do with the busy testing, the signalling of the called line, etc.

The connector D has no wipers or mechanism of any kind and the connection to desired called lines is completed by means of the counting relays which are shown in Fig. 3. There are twenty counting relays, one for each line in the system, and an extra relay, the one corresponding to the digit 0, to which no line is assigned. Only the first three relays, the extra 0 digit relay and the three succeeding relays are shown, as this is sufficient to show how the system works. The relays omitted are wired the same as the ones shown. The lines are multipled corresponding counting relays in the three trunks in the same way that lines 1 and 2, which are the lines of substations A′ and $A^2$, are connected to the counting relays 1 and 2 of the second trunk. The reference characters assigned to the counting relays in the drawing, it will be observed, are the same as the telephone numbers of the corresponding lines.

The reference character E, Fig. 2 denotes a group of four relays which are used to control the counting relays responsive to current impulses transmitted over the trunk by a calling subscriber. These relays constitute a kind of translating device the operation of which will be explained hereinafter.

Having described briefly the apparatus in the system, I will now describe more in detail the operation of this apparatus in setting up a connection. For this purpose it will be assumed that the subscriber at substation A′ desires to call the subscriber at substation $A^2$ and the operations involved in setting up the connection will be explained. When the receiver is removed at substation A′ a circuit is closed in the usual manner for the line relay 16. Upon energizing, relay 16 connects ground to the upper winding of relay 17 by means of its armature 40, and at the same time by means of its armatures 41 and 42 extends the ground connection to the upper windings of relays 18 and 19, respectively. The circuit for relay 18, it will be observed, includes the armature 43 of relay 17, while the circuit of relay 19 includes this same armature and also the armature 45 of relay 18. The other terminal of the upper winding of relay 18 is connected to the test conductor 25 which goes to the ungrounded pole of the battery at relay 101 of the connector D, provided the trunk is idle. Relays 17 and 19 are similarly connected to test conductors 21 and 29. It will be assumed now that the first trunk is busy, while the second and third trunks are idle. Test conductor 21, then, will be disconnected from battery and relay 17 will not be energized when its circuit is closed by the line relay 16. But since the second and third trunks are idle, test conductors 25 and 29 will be connected to battery as explained, and relays 18 and 19 will start to pull up at the same time. Only relay 18 is operated, however, for this relay breaks the circuit of relay 19 at its armature 45 and the latter relay at once falls back. In addition, relay 18 connects line conductors 12 and 14 to the trunk line conductors 24 and 27 by means of its armatures 44 and 47, and also connects the private normal conductor 13 to the release trunk conductor 26 at armature 46. At the same armature the release trunk conductor is connected to the locking winding of relay 18.

When the conductors of the calling line are connected with the line conductors of the second trunk line as explained above, the double wound line relay 100 of the connector D is energized over the line circuit and closes the circuit of the slow acting release relay 101. Upon energizing, the latter relay disconnects the battery from test conductor 25 at armature 107, and at armature 108 connects ground to the release trunk conductor 26. By the former operation the trunk is made busy, and by the latter the locking winding of relay 18 is energized. The cut off relay 15, which is also connected to conductor 13, is energized in parallel with the locking winding of relay 18 and operates to disconnect the two line conductors 12 and 14 from the line relay 16 and from ground, respectively. Line relay 16 is now deenergized and breaks the circuits of the trunk connecting relays, relay 18 being held in operated position by the circuit through its locking winding.

Everything is now in readiness for the calling subscriber to operate his calling device in accordance with the number of the desired line, in order to energize the proper one of the connecting relays to complete the connection, but before proceeding with this it will be necessary to consider the operation of the translating device E. When the calling device is operated it of course interrupts the line circuit a plurality of times and the line relay 100 is deenergized a like number of times to transmit a series of impulses over conductor 124. This conductor extends to the translating device E where it is adapted to be connected either to conductor 131 or conductor 132, which conductors extend to the counting relays. The odd numbered relays are adapted to be energized over conductor 131 while the even numbered relays are adapted to be energized over conductor 132; and the function of the translating device is to connect conductor 124 with conductors 131 and 132 in alternation so that the odd impulses will travel over the former conductor and the even impulses over the latter. This is accomplished as follows: When the slow acting release relay 101 energizes it connects the ungrounded pole of the battery to conductor 141 which is connected with conductors 126 and 127 at armatures 114 and 115 of the off normal relay 103, thus supplying battery to the relays of the translating device. The line relay 100 being now energized, a circuit is completed over conductor 123 for relay 152 which, upon energizing, locks itself at its armature 159, and at its armature 158 connects conductor 124 (the conductor over which impulses are transmitted) to the upper winding of relay 151 and also to conductor 131.

It will now be assumed that the line relay 100 is caused to vibrate its armature 106 responsive to a series of impulses transmitted by the calling subscriber. By this operation conductors 124 and 123 are grounded alternately. When the line relay falls back the first time conductor 124 is grounded and a circuit is closed through the slow acting relay 104 in the connector. This relay is accordingly energized and being slow acting remains in operated position throughout the series of impulses. Relay 104 at its armature 116 places a shunt around the break contact at armature 115 of the off normal relay so that battery will not be disconnected from conductor 127 when the latter relay pulls up. When conductor 124 is grounded by the deenergization of the line relay 100 an impulse of current is transmitted over conductor 131 to the first counting relay, Fig. 3, and at the same time relay 151 of the translating device E is energized. When relay 151 pulls up it prepares a circuit for relay 150 at armature 157, breaks the locking circuit of relay 152 at armature 156, and by means of the same armature closes its own locking circuit. Relay 152 now deenergizes. In Fig. 3, the No. 1 counting relay has been energized by the ground impulse transmitted over conductor 131. Upon energizing, this relay prepares a circuit for the No. 2 counting relay at armature 140, and at armature 141 closes a locking circuit for itself. This locking circuit includes a series of break contacts on the other counting relays, the conductor 129, and the off normal relay 103 in the connector D. The off normal relay is thus energized and at its armature 114 disconnects battery from conductor 126. The opening of the break contact at armature 115 has no present effect due to the fact that relay 104 is in operated position.

The grounding of conductor 124 by the line relay 100 is only momentary and when this relay pulls up a ground is placed on conductor 123, this closing the previously prepared circuit of relay 150. Upon energizing, relay 150 establishes a locking circuit for itself at armature 155, breaks the locking circuit of relay 151 at the same armature, and at armature 154 connects conductor 124 with conductor 132. The line relay 100 now falls back for the second time. As a result the conductor 124 is grounded again and a current impulse is transmitted by way of conductor 132 to the No. 2 counting relay, while at the same time relay 153 at the translating device is energized. Upon energizing, relay 153 closes a locking circuit for itself at armature 160, breaks the locking circuit of relay 150 at the same armature, and at armature 161 prepares a circuit for relay 152. The No. 2 counting relay is energized by the impulse of current coming over conductor 132 and locks itself at its armature 144, at the same time breaking the locking circuit of the No. 1 counting relay. Relay 2 also prepares a circuit for the No. 3 relay at armature 143.

The line relay now pulls up again and by grounding conductor 123 closes the circuit of relay 152. Upon energizing, relay 152 closes its locking circuit at armature 159, breaks the locking circuit of relay 153 at the same armature, and at armature 158 again connects conductor 124 to conductor 131 and to the winding of relay 151. The translating device is now in the same condition that it was before the series of impulses was started. Two impulses have been transmitted to the counting relays, the first over conductor 131 to relay 1, and the second over conductor 132 to relay 2. The next two impulses are handled in the same way. The third impulse goes over conductor 131 and energizes relay 3, while the fourth impulse is transmitted over conductor 132 and energizes relay 4. It is clear of course that each counting relay, upon energizing, breaks the locking circuit of the preceding relay so that only one of these relays can be energized at a time.

The operation of the translating device having been explained, we may proceed now with the explanation of the establishment of the connection under consideration. There is only one digit in the telephone number of substation $A^2$ and this is the digit 2. The calling subscriber will accordingly operate his calling device in accordance with this digit, thereby producing two interruptions of the line circuit and causing two deenergizations of the line relay 100. Two impulses are therefore transmitted over conductor 124, the first proceeding over conductor 131 to energize relay 1 and the second over conductor 132 to energize relay 2, all as previously explained. When the first counting relay pulls up the off normal relay 103 is energized and remains in operated position until the connection is released. The slow acting relay 104 is energized by impulses over conductor 124 and as explained before remains in operated position throughout the series of impulses. In addition to shunting the break contact at armature 115 of the off normal relay, relay 104 connects the test conductor 128 with the upper winding of the combined test and back bridge relay 102 as follows: Conductor 128, armature 117 and its working contact, resting contact of armature 118 and the said armature, and the upper winding of relay 102 to battery. The No. 2 counting relay having been energized and locked up, the trunk conductors 122, 128, and 130 are now connected to normal conductors 12′, 13′, and 14′ by way of 142, 145 and 146. Now if the called line is busy there will be a ground potential on conductor 13′ and relay 102 will be energized. Upon energizing, relay 102 prepares a locking circuit for itself at its armature 110 which is closed an instant later when the slow acting relay 104 deenergizes, closes lower trunk line conductor and connects its lower winding thereto at armature 112, at the same time disconnecting the ringing machine RM, and at armature 113 closes a circuit to the busy relay. The latter relay is energized in series with the lower winding of relay 102, but interrupts its own circuit and thus produces a tone on the line which is heard by the calling subscriber and indicates to him that the desired line is engaged and inaccessible for the time being.

Having considered the case where the called line is busy, it will now be assumed that the line is idle when called. Under these circumstances when the connection is completed by the energization of the No. 2 counting relay, as explained hereintofore, no ground will be found on conductor 13′ and relay 102 in the connector D will not be energized. Instead, when the slow acting relay 104 falls back, a circuit is closed for the switching relay 105 as follows: From the grounded armature 108 of relay 101 by way of its right hand working contact, armature 110 and its resting contact, upper winding of relay 105, resting contact of armature 117 and the said armature, conductor 128, armature 145 and its working contact, conductor 13′, and the winding of the cut off relay 15′, Fig. 1, to battery. Upon the closure of the above circuit relays 105 and 15′ are energized in series and the latter relay clears the line of substation $A^2$ in the usual manner. Relay 105, upon energizing, closes a locking circuit for itself and grounds conductor 128 at armature 119, disconnects the busy relay at armature 120, and at armatures 118 and 121 closes contacts in the trunk line conductors 122 and 130.

The connection having been established the ringer at the called station is operated by the ringing machine RM and the called subscriber is advised that a call has been received. Any approved type of ringing equipment may be used of course, depending on what is most convenient. The ringing machine shown is exceedingly simple and consists of a single vibrating relay which is equipped with a weighted armature, vibrating at a frequency of about 20 cycles per second. This armature connects ground and battery alternately to the lower line conductor of the connector and thus alternately charges and discharges the condenser which is in series with the ringer at the called station. This produces an alternating current through the ringer and operates it.

Relay 102 is not energized by the current through the ringer and condenser, but when the called subscriber removes his receiver this relay pulls up when the armature of the ringing machine RM is connected to ground at its resting contact, connects its lower winding to the lower trunk line conductor, disconnects the ringing machine, and closes the talking circuit. The required connection is now completely established. The transmitter at the calling substation A′ is supplied with talking battery through the windings of the line relay 100, while the transmitter at the called substation $A^2$ is supplied with talking battery through the windings of the back bridge relay 102. The talking circuit itself is shown in heavy lines and will be understood without difficulty. It is to be noted that when relay 104 falls back after impulses have ceased battery is disconnected from conductor 127 and relay 152 in the translating device is deenergized. Since the off normal relay 103 remains energized during conversation the relays in the translating device and the counting relays cannot be disturbed by accidental operation of the dial or a momentary opening of the line circuit by the receiver hook.

When the calling subscriber hangs up his receiver the connection is released by the deenergization of relays 100 and 101. When the latter relay falls back ground is disconnected from conductor 26 and the cut off relay 15 and trunk connecting relay 18 are deenergized. At the same time ground is disconnected from armature 119 of relay 105 and therefore conductor 128. As a result the switching relay 105 falls back and also the cut off relay 15′ of the called line. Relay 101 also disconnects battery from the off normal relay 103 and this operation breaks the locking circuit of the No. 2 counting relay which thereupon deenergizes also. Thus all the apparatus is restored to normal position.

The first nine lines have telephone numbers running from 1 to 9, and are reached by calling a single digit, as has been explained. The remaining ten lines have telephone numbers running from 01 to 00 and two digits or two operations of a calling dial are required to reach these lines. The digit 0 is not assigned to any line but the 0 counting relay is used as a means of transferring to the second ten counting relays. This may be readily explained by assuming that line 03 is being called. When the calling subscriber calls the digit 0, counting relays 1 to 0 are energized successively and at the end of the series of impulses relay 0 remains pulled up. This relay is locked direct to battery by way of conductor 125, the locking circuit including the off normal relay 103 at the connector D. Relay 103 accordingly deenergizes, since there is no counting relay locked up to conductor 129, and connects battery to conductors 126 and 127, thus preparing circuits for the transmission of another series of impulses. On the next operation of the dial relays 01, 02, and 03 are energized in succession and the last relay is locked up to complete the required connection. The locking circuit includes conductor 129 and off normal relay 103, and the off normal relay is energized now and prevents any further relay operations.

If desired the capacity of the system may be increased by adding ten more counting relays to each trunk, these added relays being numbered from 001 to 000. The twentieth relay will then be connected in the same way as the tenth or 0 relay and will enable impulses to be sent on to the new group of ten counting relays. This will give a capacity of 29 lines. Of course the size can be increased to 39 or 49 lines in the same way, but the number of trunk lines will then have to be increased also and a limit is soon reached beyond which it will not be economical to go.

Having described my invention that which I consider to be new and desire to have protected by Letters Patent will be pointed out in the appended claims.

What I claim is:

1. In a telephone system, subscribers' lines, trunk lines, a series of connecting relays associated with each trunk line, each series comprising a relay individual to each subscriber's line, means whereby a calling subscriber can connect with an idle trunk line, means whereby the calling subscriber can energize the relays associated with the connected trunk line successively by impulses transmitted over the connected trunk line, and means for maintaining the last energized relay in operated position to complete the connection to a called line and to maintain said lines connected during conversation.

2. In a telephone system, a trunk line comprising talking conductors, trunk and line connecting relays at opposite ends of said trunk line, respectively, there being a trunk and a line connecting relay individual to each subscriber's line in the system, means for energizing a trunk connecting relay responsive to the removal of the receiver on a calling line to connect the talking conductors of said calling line with the talking conductors of said trunk line, and means controlled by the calling subscriber for energizing one of said line connecting relays to connect the talking conductors of said trunk with the talking conductors of a called line.

3. In a telephone system, a trunk line, trunk and line connecting relays at opposite ends of said trunk line, respectively, each line connecting relay being individual to a different subscriber's line, means for energizing a trunk connecting relay responsive to the removal of the receiver on a calling line to connect the calling line with the said trunk line, means whereby the calling subscriber can transmit impulses over the trunk to energize said line connecting relays successively, and means for maintaining one of said line connecting relays in operated position to connect the trunk with a desired called line and to maintain the said calling and called lines connected over said trunk line during conversation.

4. In a telephone system, a trunk line, trunk and line connecting relays at opposite ends of said trunk line, respectively, means for energizing a trunk connecting relay responsive to the removal of the receiver on a calling line to connect the calling line with the said trunk line, means whereby the calling subscriber can transmit impulses over the trunk line to energize said line connecting relays successively, and means for de-energizing each relay when the next one is energized, the last relay which is energized being maintained in operated position to connect the trunk line with a called line and to maintain said calling and called lines connected during conversation.

5. In a telephone system, a subscriber's line, a group of trunk lines, a trunk selector for said first line comprising a series of connecting relays, there being as many relays as there are trunk lines, a line relay operated responsive to the removal of the receiver on said subscriber's line for closing energizing circuits for all of said connecting relays except those associated with busy trunk lines, a pair of break contacts on each relay except the last, and circuit connections whereby each relay upon energizing opens the circuits of all succeeding relays in the series at its associated pair of break contacts.

6. In a telephone system, a subscriber's line, a group of trunk lines. a trunk selector for said first line comprising a series of connecting relays, there being as many relays as there are trunk lines, a line relay operated responsive to the removal of the receiver on said subscriber's line for closing energizing circuits for all of said connecting relays except those associated with busy trunk lines, a pair of break contacts on each relay except the last, circuit connections whereby each relay upon energizing opens the circuits of all succeeding relays in the series at its associated pair of break contacts, whereby only one of said connecting relays will be completely operated, a third conductor in each trunk line, and means for closing a locking circuit for the operated connecting relay over the third conductor of the trunk line associated therewith.

7. In a telephone system, a subscriber's line, a group of trunk lines, a trunk selector for said first line comprising a series of connecting relays, there being as many relays as there are trunk lines, a line relay operated responsive to the removal of the receiver on said subscriber's line for closing energizing circuits for all of said connecting relays except those associated with busy trunk lines, means whereby each relay upon energizing opens the circuits of all succeeding relays in the series, whereby only one of said connecting relays will be completely operated, a third conductor in each trunk line, means for closing a locking circuit for the operated connecting relay over the third conductor of the trunk line associated therewith, and a cut off relay energized over the said third conductor in parallel with said connecting relay when the locking circuit therefor is established.

8. The combination, with a control circuit having two branches, of means for transmitting impulses of current over said circuit, means for connecting said branches alternately to said circuit when a series of impulses is transmitted thereover, a series of relays adapted to be successively energized by successive impulses transmitted over one of said branches, and a second series of relays adapted to be successively energized by impulses transmitted over the other of said branches.

9. In a telephone system, a series of counting relays, a conductor associated with the even numbered relays and another conductor associated with the odd numbered relays, a contact maker for sending current impulses over said conductors to energize said relays, and a translating device whereby the impulses are transmitted over said conductors alternately.

10. The combination, with a control circuit having two normally disconnected branches, of a relay for connecting each branch to said circuit, means for energizing said relays alternately, and means for transmitting impulses over said control circuit.

11. The combination, with a control circuit having two normally disconnected branches, of two relays for connecting said two branches, respectively, to said control circuit, a line relay and means for intermittently operating it to transmit impulses over said control circuit, and circuit connections whereby the said first mentioned relays are operated alternately by said line relay while impulses are being transmitted.

12. The combination, with a control circuit and a line relay for transmitting impulses thereover, of two branches for said control circuit, and a translator for causing the odd impulses of a series to traverse one branch and the even impulses the other branch, said translator comprising four relays and circuit connections whereby they are energized successively in response to the operation of said line relay.

13. The combination, with a line relay and a circuit therefor, of means for producing a series of interruptions in said circuit to cause said relay to transmit a series of impulses, a train of counting relays, circuit connections whereby a plurality of said relays are energized successively responsive to said impulses, means for retaining the last energized relay in operated position, and means for preventing any additional relay or relays of said train from energizing responsive to a second series of impulses.

14. The combination, with a line relay and a circuit therefor, of means for producing a series of interruptions in said circuit to cause said relay to transmit a series of impulses, a train of counting relays, circuit connections whereby a plurality of said relays are energized successively responsive to said impulses, means for retaining the last energized relay in operated position, means for preventing any additional relay or relays of said train from energizing responsive to a second series of impulses, and means for rendering said preventive means ineffective in case the said first series of impulses includes a particular number of impulses.

15. The combination, with a line relay and a circuit therefor, of means for producing a series of interruptions in said circuit to cause said relay to transmit a series of impulses, a train of counting relays, circuit connections whereby a plurality of said relays are energized successively responsive to said impulses, a locking circuit common to said train for retaining the last energized relay in operated position, a stop relay included in said locking circuit for preventing said line relay from transmitting impulses to said counting relays, and a slow-acting relay adapted to maintain its armature attracted during the series of impulses to render the stop relay ineffective until after the last impulse of the series has been transmitted.

16. The combination, with a line relay and a circuit therefor, of means for producing a series of interruptions in said circuit to cause said relay to transmit a series of impulses, a train of counting relays, circuit connections whereby a plurality of said relays are energized successively responsive to said impulses, a locking circuit common to said train for retaining the last energized relay in operated position, a stop relay included in said locking circuit for preventing said line relay from transmitting impulses to said counting relays, a slow-acting relay adapted to maintain its armature attracted during the series of impulses to render the stop relay ineffective until after the last impulse of the series has been transmitted, and a second locking circuit for a particular one of said counting relays, said second locking circuit excluding said stop relay, whereby if a particular series of impulses is transmitted the first time the counting relays are able to respond to a second series.

17. In a telephone system, a trunk line, means for connecting a calling line to said trunk line, a train of counting relays, multiple trunk contacts on each relay connected to the talking conductors of said trunk line, individual contacts on each relay connected to the line conductors of a particular subscriber's line, and means controlled over the calling line for energizing any counting relay to cause the engagement of its associated multiple and individual contacts to establish a talking connection with a desired called line.

18. In a telephone system, a trunk line, means for connecting a calling line to said trunk line, a train of counting relays, multiple trunk contacts on each relay connected to the talking conductors of said trunk line, individual contacts on each relay connected to the line conductors of a particular subscriber's line, a line relay bridged across said trunk line and controlled from the calling line to transmit impulses for operating said counting relays successively, and means for maintaining the last energized relay in operated position to establish a talking connection between the said calling line and called line by way of its associated multiple and individual contacts.

19. In a telephone system, a trunk line, a relay at one end of said trunk line for connecting said trunk line to a calling line, means comprising a train of counting relays at the other end of said trunk line for connecting said trunk line with any desired called line, the said counting relays being responsive to the impulse sender on the calling line, and means in said trunk line for supplying talking current to the calling and called lines through contacts on said first relay and an energized counting relay, respectively.

20. In a telephone system, a trunk line, a relay at one end of said trunk line for connecting said trunk line to a calling line, means comprising a train of counting relays at the other end of said trunk line for connecting said trunk line with any desired called line, the said counting relays being responsive to the impulse sender on the calling line, and a signaling device associated with said trunk line for transmitting signalling current to the called line by way of contacts on an energized counting relay.

21. In a telephone system, a trunk line, a relay at one end of said trunk line for connecting said trunk line to a calling line, means comprising a train of counting relays at the other end of said trunk line for connecting said trunk line with any desired called line, the said counting relays being responsive to the impulse sender on the calling line, normally open contacts in said trunk line, a switching relay for closing said contacts, means for testing the called line through contacts on an energized counting relay, means for operating said switching relay if the called line is idle, and means for preventing the operation of said switching relay if the called line is busy.

22. A telephone system including a selector switch having a series of relays, a plurality of lines selectable by said relays, an impulsing circuit for energizing the relays in succession, means for maintaining the last relay of the series energized to select the desired line and for de-energizing the previously energized relays of the series, busy signaling means, automatic testing means for connecting a calling subscriber's line with the said selected desired line if said last line is idle, and to connect said busy signaling means in a circuit with the calling line if said selected desired line is busy.

23. A telephone system including a selector switch having a series of relays, a plurality of lines selectable by said relays, an impulsing circuit for energizing the relays in succession, means for maintaining the last relay of the series energized to select the desired line and for de-energizing the previously energized relays of the series, automatic testing means for connecting a calling subscriber's line with the said selected desired line if said last line is idle, and means for either signaling the said desired line if it is idle, or for transmitting a busy signal to the said calling line if said desired line is busy.

24. A telephone system including a selector switch having a series of relays, a calling line and a plurality of lines selectable by said relays, means for operating said relays in rotation and means for maintaining the last relay of the series operated to select and connect the desired called line in circuit with said called line and for de-energizing the previously energized relays of the series, automatic test means, and means for operating said test means if the selected line is idle to apply ringing current to said selected line, said test means not being affected by said last means if said selected line is busy whereby a busy signal is transmitted to said calling line.

25. A telephone system including a selector switch having a group of relays in series, a plurality of lines selectable by said relays, means for energizing said relays in rotation, the second relay energizing opens the holding circuit for the first energized relay, the third relay energizing opens the holding circuit for said second relay, etc., means for maintaining the relay of the series last to energize operated to select one of said lines, and automatic test means for connecting a calling line with said selected line if said selected line is idle.

26. A telephone system including a selector switch having a series of relays, a plurality of called lines adapted to be selected by said relays, a calling line and means controlled over said calling line for operating the relays of the series in rotation, means for maintaining the last operated relay of the series energized to select one of said called lines, and for restoring the previously operated relays of the series, test means, other means for effecting said first means to cause the operation of said test means to connect said selected called line in circuit with said calling line if said called line is idle and to connect ringing means to said called line.

27. A telephone system including a calling subscriber's line and a plurality of called subscribers' lines, a selector switch having a series of relays, an impulse circuit for energizing the relays in succession, means for de-energizing all of the relays of the series that have been operated except the last one, said last relay remaining energized to connect the calling subscriber's line with the called subscriber's line, means for ringing the called subscriber, and means for automatically disconnecting ringing current from the called subscriber's line.

28. A telephone system including a series of relays, a calling line, a plurality of selectable called lines adapted to be selected by said switching relays, impulse means for successively energizing said relays, means for maintaining the last energized relay of the series operated to select one of said called lines while the previously energized relay of the series returns to normal, automatic test means for interconnecting said calling line and said selected line, and for connecting ringing means to said called line if said selected line is idle and for preventing the interruption of and the application of ringing current to said selected line if busy, and means for rendering said calling line and said selected line busy when said lines are in use.

Signed by me at Chicago, Cook County, Illinois, this 29 day of June, 1925.

RODNEY G. RICHARDSON.